United States Patent [19]

Bunger et al.

[11] Patent Number: 5,082,644
[45] Date of Patent: Jan. 21, 1992

[54] APPARATUS AND PROCESS FOR THE PRODUCTION OF ACETYLENE

[75] Inventors: James W. Bunger; Hoil Ryu; Prasad A. V. Devineni, all of Salt Lake City, Utah

[73] Assignee: University of Utah, Salt Lake City, Utah

[21] Appl. No.: 704,713

[22] Filed: May 17, 1991

Related U.S. Application Data

[63] Continuation of Ser. No. 434,270, Oct. 30, 1989, abandoned.

[51] Int. Cl.$^5$ .............. C01F 11/28; C01F 11/02; C10H 15/00
[52] U.S. Cl. ............................. 423/497; 48/216; 423/636
[58] Field of Search .......... 423/497, 636, 635; 48/216, 217, 23, 38

[56] References Cited

U.S. PATENT DOCUMENTS

| | | | |
|---|---|---|---|
| 2,636,807 | 4/1953 | Ross et al. | 423/497 |
| 2,701,190 | 2/1955 | Ritter et al. | 48/216 |
| 2,951,748 | 9/1960 | Murphy et al. | 48/216 |
| 3,339,618 | 9/1967 | Bowden et al. | 423/497 |
| 4,451,268 | 5/1984 | Lerch | 48/216 |

Primary Examiner—John Niebling
Assistant Examiner—Brian M. Bolam
Attorney, Agent, or Firm—Christiansen and Sonntag

[57] ABSTRACT

A two-stage process for producing acetylene and calcium chloride from calcium carbide and water has two successive reaction steps. In step Number 1, calcium carbide is charged into an entrained flow-type reactor vessel containing water. The reaction which follows proceeds to about 60-90% completion. The entrained reaction products and the unreacted feed material are carried over to a secondary reactor to complete the reaction, and the acetylene gas is drawn off. Calcium hydroxide product is removed from the reactor and reacted with hydrogen chloride to form calcium chloride. Heat generated by the exothermic reactions of water with calcium carbide and HCl with calcium hydroxide is used to dry the calcium chloride product and improve its value. In the presence of excess water, the calcium carbide-water reaction is effectively a first order, irreversible reaction.

19 Claims, 4 Drawing Sheets

APPARATUS AND PROCESS FOR THE PRODUCTION OF ACETYLENE

This application is a continuation of U.S. patent application Ser. No. 07/434,270, filed on 10/30/89, and now abandoned.

BACKGROUND OF THE INVENTION

The invention comprises a Process for simultaneous manufacture of acetylene and calcium chloride from calcium carbide and hydrogen chloride.

In the currently practiced art, calcium carbide is charged to a large tank containing water and which is outfitted with slow moving stirring paddles. The carbide is dropped onto the surface of the water where it is allowed to react spontaneously. Acetylene gas is withdrawn from the top of the tank while calcium hydroxide and other impurities settle to the bottom of the tank. The reactor is cooled by internal coils containing cooling water or by spraying cold water on the exterior of the tank or both. The calcium hydroxide produced, along with its impurities, is discharged, stockpiled and disposed of as a low value neutralizer for industrial acid streams or for maintaining pH balance in sewage plants. Depending upon the application, acetylene is compressed and stored in high pressure vessels or, in cases where it is used as a chemical feedstock, is pipelined to a nearby chemicals processing plant.

The current problems with the state-of-the-art technology are:

A. Uncontrolled contact of the carbide with the water, resulting in lower reaction rate control and the possibility of incandescence. Incandescence results when calcium carbide particles are buoyed by the evolution of acetylene and rise to the surface of the water where they react violently but without the benefit of cooling that prevails when the particles are submerged. The lack of cooling and the high exothermicity of the reaction may result in a localized temperature rise which heats the particle to incandescent or glowing temperatures. If the pressure of the acetylene is higher than approximately 27 pounds per square inch absolute, this condition may initiate detonation or deflagration reactions within the acetylene, resulting in a substantial pressure rise, rupture of the vessel, and uncontrolled release of the contents. This condition presents a significant fire and safety hazard. Thus, poor reaction control results in a higher probability for adverse chemical reactions and necessitates the requirement that the primary reaction vessel be operated at a low operating pressure.

B. Currently practiced technology utilizes a single reactor vessel of a stirred tank reactor design. Because of the inherent characteristics of a stirred tank reactor large vessels are required in relationship to the throughout of carbide to avoid discharge of unreacted carbide. In practice, slow mixing results in a reactor which is neither an ideal CSTR or ideal plug flow reactor and for which little is known of the local processes occurring This condition results in poor rate control and unsteady operation.

C. Currently practiced technology results in extremely low utilization of the available heat evolved in the exothermic reaction between calcium carbide and water. In currently practiced technology, little or none of the heat produced is used. This heat amounts to about 20% of the available chemical energy in the reactor and is wasted through the requirements of cooling.

D. In currently practiced technology, little or no effort is made to improve the quality of the calcium hydroxide byproduct. Calcium hydroxide produced in acetylene manufacturing contains substantial impurities originating from coal, coke or limestone used in the manufacture of the calcium carbide. These impurities render the calcium hydroxide produced of extremely low or no market value.

It is an objective of the present invention to overcome those problems in its prior art identified above.

The process of the invention consists of a two-stage reactor system in which calcium carbide and water are reacted to form acetylene and calcium hydroxide The calcium hydroxide is subsequently reacted with hydrogen chloride in a neutralizer to form calcium chloride. The calcium chloride may be marketed in an aqueous form or alternatively sent to a drying apparatus to produce marketable anhydrous calcium chloride.

The invention embodies a unique, dual reactor configuration in which water and calcium carbide are mixed in an entrained flow-type reactor. The reaction is allowed to occur in a dilute aqueous phase with residence times such that the reaction proceeds to 60-90% completion while in the primary reactor. Entrained reaction products and unreacted feed material are carried overhead to the secondary reactor which consists of a dense phase, laminar plug-flow type reactor. Calcium hydroxide intermediate product is allowed to settle and is removed from the bottom of the reactor. Unreacted water is separated from the calcium hydroxide by use of an overflow wier and recycled to the primary reactor. The combination of the Primary reactor and the secondary reactor are such that the majority of reaction occurs in a stirred-tank reactor type configuration which undergoes a transition in the secondary reactor to a plug-flow reactor configuration. The plug-flow reactor allows for the completion of the reaction of calcium carbide with water. In the presence of excess water, the reaction of calcium carbide with water is effectively a first order, irreversible reaction

THE DRAWING

A preferred embodiment of the invention is shown in the accompanying drawings.

FIG. 1 is a chart showing a reactor system in which calcium carbide hydrogen chloride and water are reacted to form acetylene and calcium chloride;

FIG. 2, a chart showing the two-stage reactor configuration;

FIG. 3, the details of the upper section of a vertical, tubular primary reactor; and FIG. 4, a detailed diagram of a secondary reaction vessel.

DETAILED DESCRIPTION OF THE PREFERRED EMBODIMENT

Figure 2:
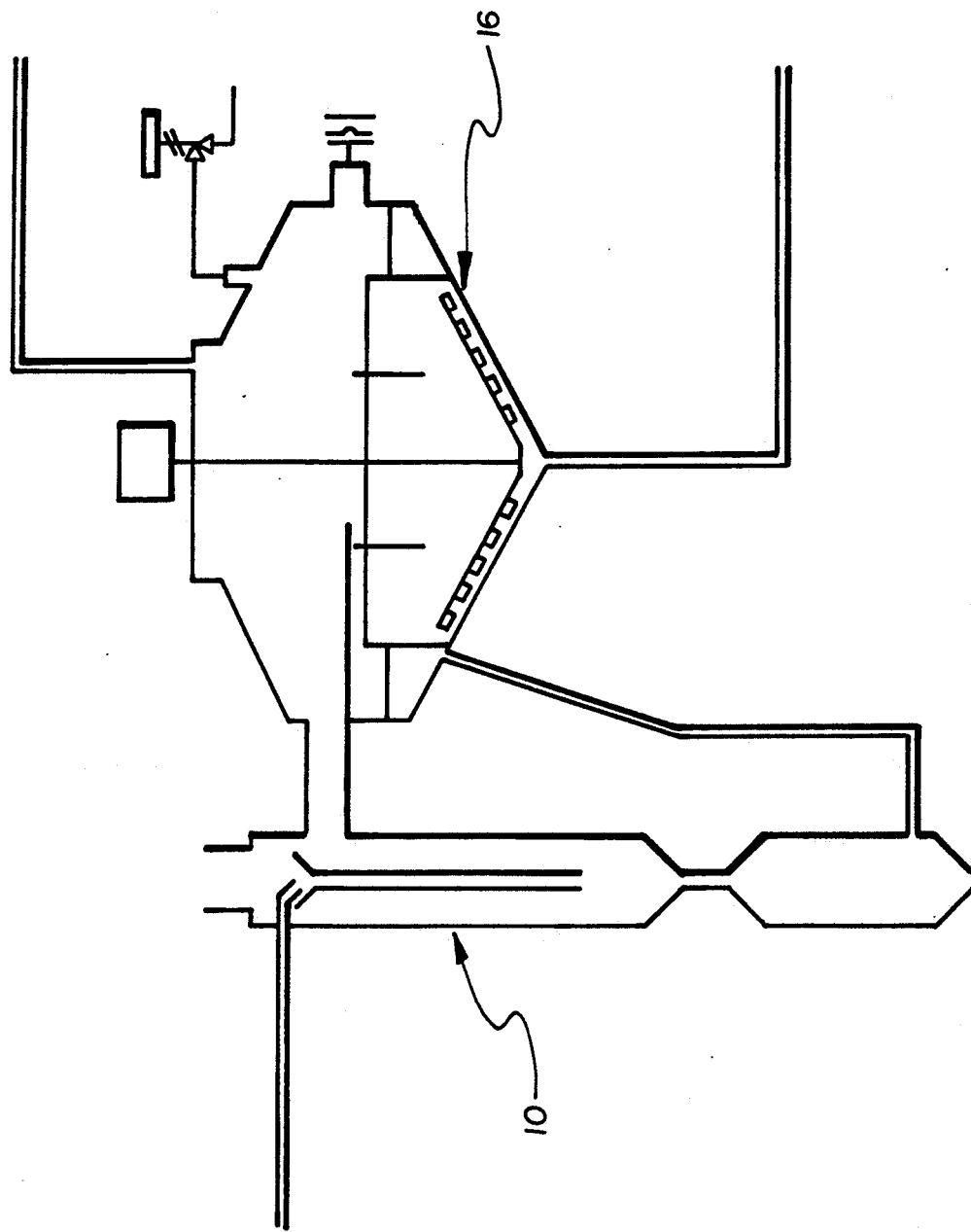
Figure 3:
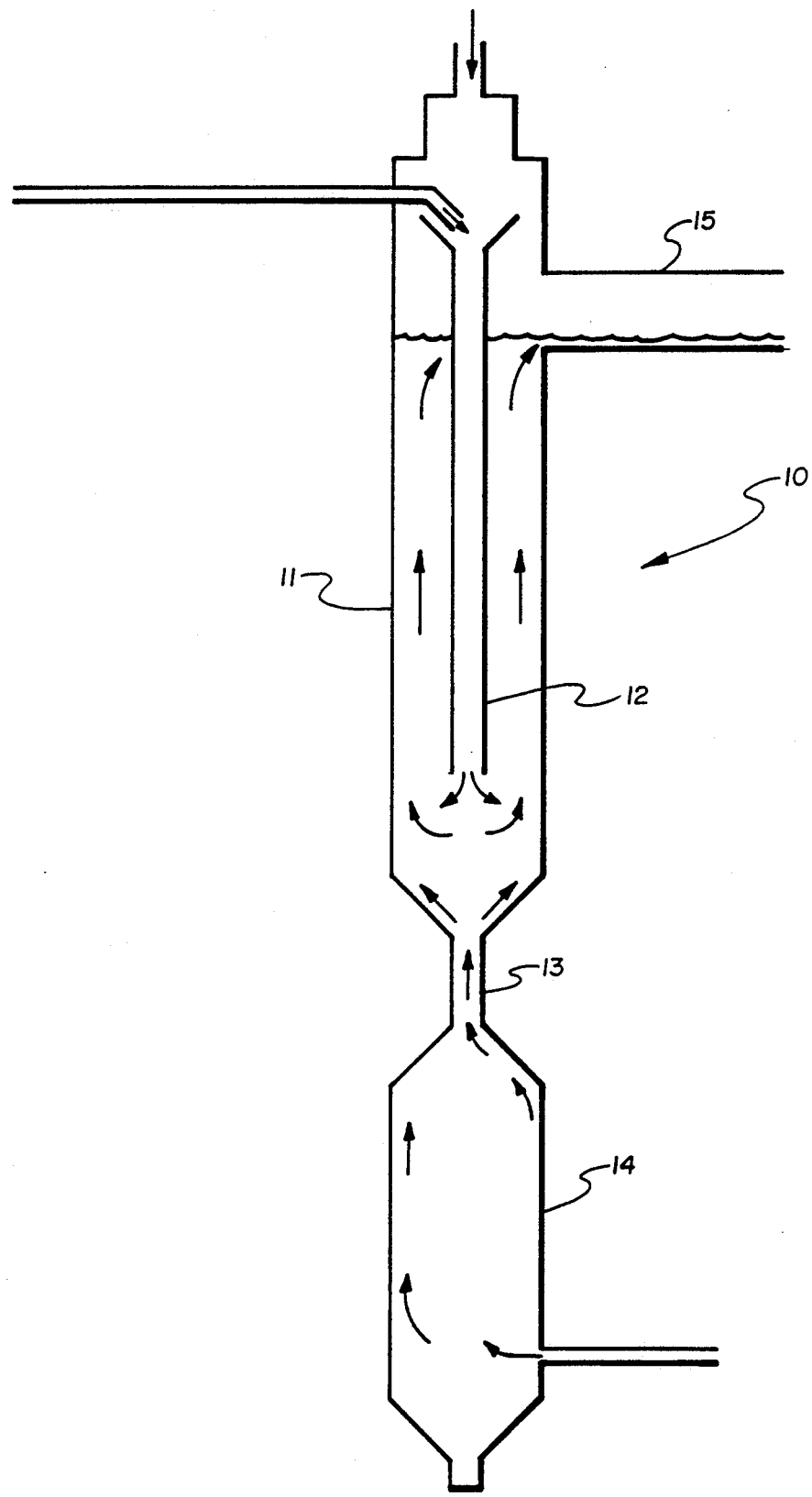
Figure 4:
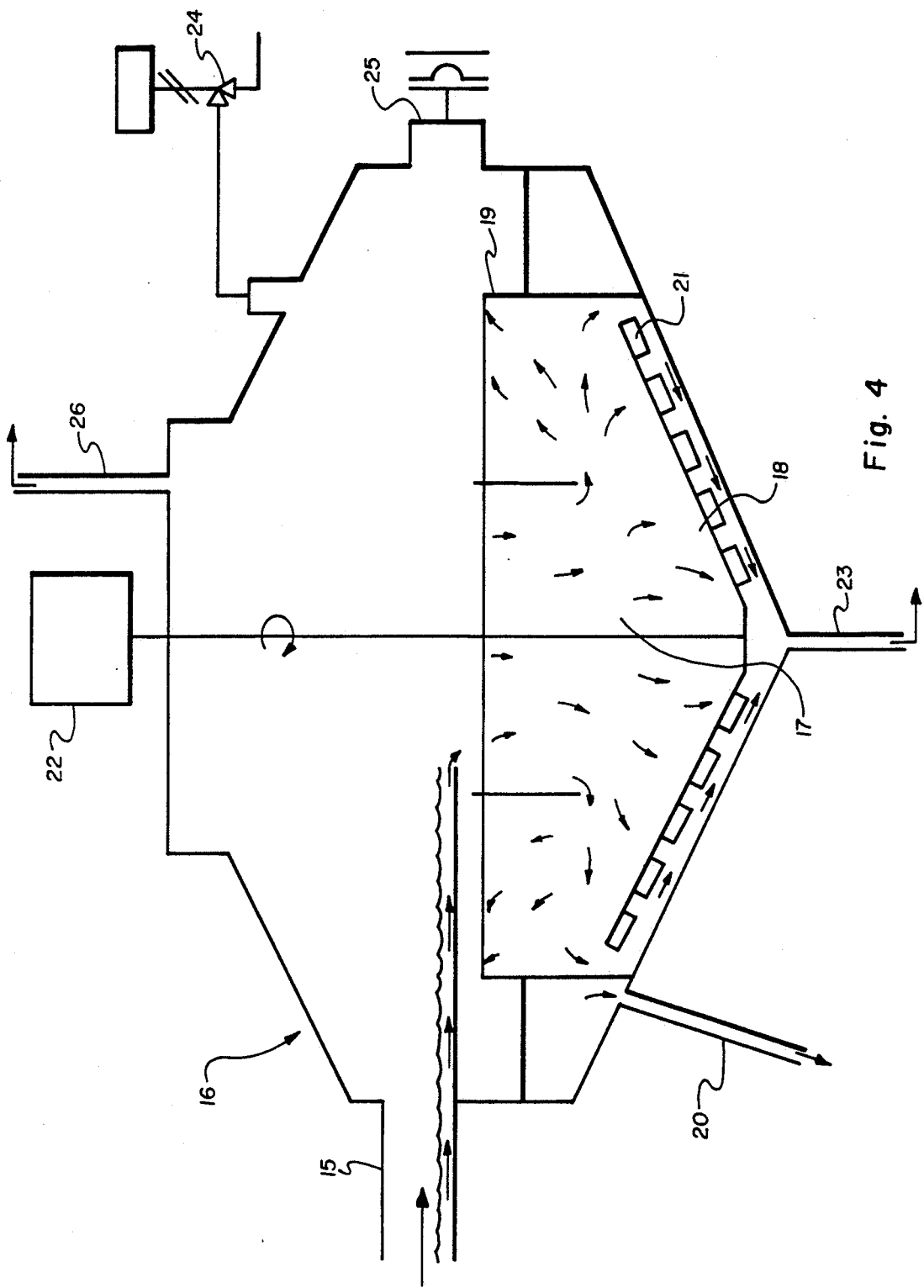

FIG. 2 illustrates the complete dual reaction system showing the initial reactor 10 and the secondary reactor 16, described in further detail in FIGS. 3 and 4.

As shown in FIG. 3, the primary reactor 10 consists of an upper section 11 of a vertical, tubular design The upper section 11 is outfitted with an annular downcomer tube 12 to which makeup water is charged. Calcium carbide is introduced to the center of the downcomer tube 12 and passes through the downcomer tube 12 in a co-current fashion with the water. Reaction is initiated at this point. The reactants proceed to the bottom of the upper section 11 where they comingle with recycled water passing through the velocity control restriction 13. The calcium carbide continues to react with the water in the bottom of the upper zone until the particle size reaches approximately 2-3 millimeters in diameter, at which time the Particles are entrained by the upward flow of the fluid phase and carried via the side arm attachment to the secondary reactor. Residence times in the primary reactor 10 are on the order of 1-3 minutes.

Unreacted impurities in the calcium carbide which are more dense than calcium carbide pass downward through the velocity control restrictor 13 and are accumulated in the lower section 14 of the primary reactor 10. Recycled water from the secondary reactor is introduced near the bottom of the lower Section 14 of the primary reactor 10. The rate at which this recycled water is introduced is determined by the required velocity in the velocity control restriction 13. The velocity in this section is controlled such that particles which have a density greater than calcium carbide pass downward through the zone, while calcium carbide particles are entrained upward due to the velocity which is in excess of the terminal velocity of the particle. Nonreacting and heavy impurities are withdrawn from the lower section 14 of the primary reactor 10 either continuously or periodically through an appropriate valve (not shown).

After the reaction is 60-90% complete, the unreacted calcium carbide and the intermediate reaction product, calcium hydroxide, along with acetylene and unreacted water pass through the side arm connector 15 to the secondary reaction vessel 16 shown in FIG. 4.

The secondary reactor vessel 16 is a circular vessel of sufficient size so as to provide a calcium hydroxide settling time of 30 minutes to two hours. The overflow material from the primary reactor 10 is introduced into an inner annular zone 17 where it is allowed to flow in a downward fashion and where the calcium hydroxide is allowed to settle in a dense zone 18.

Unreacted calcium carbide reacts to completion in the secondary reactor 16. Supernatant unreacted water is allowed to overflow an internal wier 19 of a concentric annular design, where it is pumped through a tube 20 to the lower zone of the primary reactor 10. Settled calcium hydroxide is raked toward the bottom of the reactor zone. The rake 21 is driven by a mechanical device 22 designed for an appropriate speed of revolution of approximately 1-6 revolutions per minute.

Calcium hydroxide is withdrawn from the bottom of the secondary reactor 16 through a tube 23 and sent to a hydrogen chloride neutralizer (not shown). The secondary reactor 16 is also outfitted with an over-pressure relief valve 24 to vent acetylene gasses in the event of failure of filters and back pressure relief devices (not shown). The secondary reactor is also fitted with appropriate rupture disks 25 safely vented to areas of no human occupancy for the purpose of safely venting any deflagration of detonation which may occur as a result of the auto-reactions of acetylene. The acetylene product is generated and taken from the secondary reaction vessel 16 through a tube 26 through drying and filtering devices (not shown) as required to render the product marketable.

Figure 1:
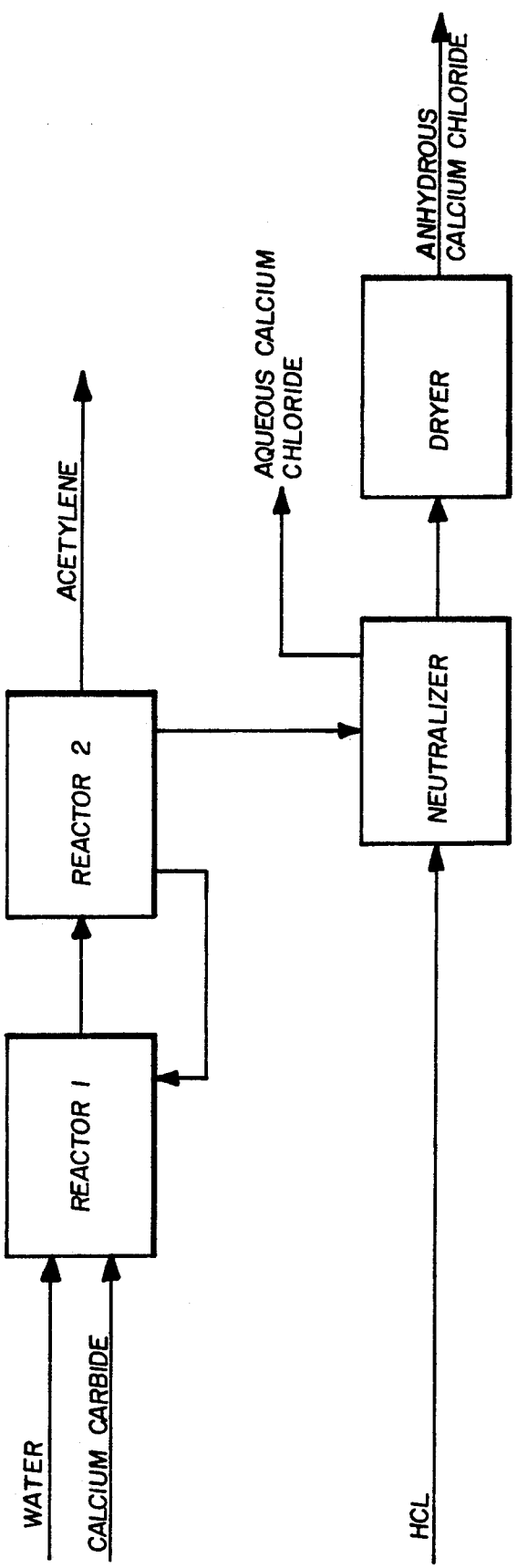

As shown in FIG. 1, the calcium hydroxide is sent to a neutralizer section where it is mixed with hydrochloric acid. The neutralizer reaction consists of an open tubular reactor of sufficient volume to allow residence times between 1-5 seconds. The ensuing reaction generates heat and produces dissolved calcium chloride and water. Alternatively, anhydrous hydrogen chloride may be added to the calcium hydroxide stream from the secondary reactor to form the same products but without the additional water contained in the hydrochloric acid. The quantity of HCl added is controlled through monitoring by pH meters or other appropriate monitors. Insoluble solids contained in the calcium chloride stream may be gravity separated through the use of cyclone separators or settling towers. Alternatively, the solution may be filtered to remove insoluble solids prior to drying.

The aqueous calcium chloride may be marketed as a product or, alternatively, sent to a drying apparatus where the water is removed from the calcium chloride. Drying improves the market value of calcium chloride. Heat generated in the Primary reactor and secondary reactor and the neutralizer are retained, insofar as is safely possible, as sensible heat of the calcium chloride solution. At this high temperature sensible heat contributes significantly to the energy efficiency of the drying apparatus and minimizes the amount of external heat which must be added to perform the drying operation. Excess heat generated in the reactors and the neutralizer (see FIG. 1) may be used to heat air used in the dryer. The dryer configuration may consist of any number of commercially available spray-type dryers designed for evaporation of liquid from crystalline or solid materials. A secondary dryer may be incorporated to further reduce the amount of water-of-hydration. The secondary dryer will require additional heat and may be of the configuration of commercially available fired-heater dryers. A product of the drying operation is an anhydrous calcium chloride which may be marketed.

Obviously, numerous additional modifications and variations on the present invention are possible in light of the above teachings. It is therefore to be understood that within the scope of the appended claims, the invention may be practiced otherwise than as specifically described herein.

We claim:

1. A process for the production of acetylene which comprises;
   (i) continuously adding an excess of water and particulate calcium carbide to a primary reactor,
   (ii) contacting in the primary reactor the water and calcium carbide for reaction to form acetylene gas and calcium hydroxide under aqueous phase reaction conditions with a residence time to react between 60% and 90% of the calcium carbide,
   (iii) transferring the unreacted calcium carbide to a secondary reactor,
   (iv) reacting the unreacted calcium carbide in the secondary reactor under plug-flow reaction conditions,
   (v) recovering acetylene gas generated in the primary reactor and the secondary reactor, and,
   (vi) recovering calcium hydroxide from the secondary reactor.

2. The process of claim 1 additionally comprising the step of recycling water from the secondary reactor to the primary reactor.

3. The process of claim 1 wherein the residence time in the primary reactor is such to react between 60 and 90 percent of the calcium carbide.

4. The process of claim 1 wherein the contacting is accomplished by directing a flow of water upwards through particles of calcium carbide.

5. The process of claim 4 wherein the upward flow of water is regulated to entrain partially reacted particles of calcium carbide for transfer to the secondary reactor.

6. The process of claim 4 wherein the upward flow of water is regulated to entrain particles of calcium carbide which have reacted a size between about 2 and 3 millimeters in diameter.

7. The process of claim 4 wherein calcium hydroxide produced in the primary reactor from reaction of the calcium carbide and water is entrained in the upward flow and transferred to the secondary reactor.

8. The process of claim 1 wherein particles having a density greater than calcium carbide are removed from the primary reactor.

9. The process of claim 8 wherein the particles are removed by an upward flow of water in a restrictor zone at a velocity such that particles having a density greater than calcium carbide are carried downward through the zone.

10. The process of claim 1 wherein the plug-flow reaction environment in the secondary vessel is under conditions wherein the calcium hydroxide produced by reaction of the calcium carbide and water is allowed to settle.

11. The process of claim 10 wherein the calcium hydroxide settles to a dense zone in the bottom of the secondary reactor.

12. The process of claim 11 wherein the calcium hydroxide is removed from the secondary reactor by directing flow from the dense zone through a tube.

13. The process of claim 1 wherein the calcium hydroxide removed from the secondary reactor is reacted with hydrogen chloride to form calcium chloride.

14. The process of claim 13 wherein the hydrogen chloride is hydrochloric acid.

15. The process of claim 13 wherein the hydrogen chloride is anhydrous hydrogen chloride.

16. The process of claim 13 wherein the calcium chloride is dried.

17. The process of claim 16 wherein heat produced by reaction of the calcium carbide and water in the primary reactor is conveyed to the calcium chloride drying means.

18. The process of claim 13 wherein heat produced by the neutralization of the calcium hydroxide and hydrogen chloride is used to dry the calcium chloride.

19. A two-stage process for producing acetylene and calcium chloride, with safety, clarification, heat utilization and using minimum reactor space, comprising the steps of:
reacting calcium carbide with an excess of water in a primary entrained flow reaction vessel to form acetylene gas and calcium hydroxide;
permitting said reaction to proceed for a period of from one to three minutes to achieve from 60% to 90% completion in the primary reaction vessel with the production of heat;
permitting dense and unreactive impurities to settle and separate from desirable reaction products in the primary reaction vessel;
transferring entrained reaction products acetylene gas and calcium hydroxide with unreacted water and calcium carbide to a secondary reaction vessel culminating in a laminar plug-flow reaction;
substantially completing the reaction in the secondary reaction vessel with the production of heat;
recovering the acetylene and calcium hydroxide from the secondary reaction vessel; and
recovering and utilizing the heat produced from the production of acetylene.

* * * * *